J. T. FUDGE.
COUPLING.
APPLICATION FILED APR. 25, 1916.
1,246,255.
Patented Nov. 13, 1917.
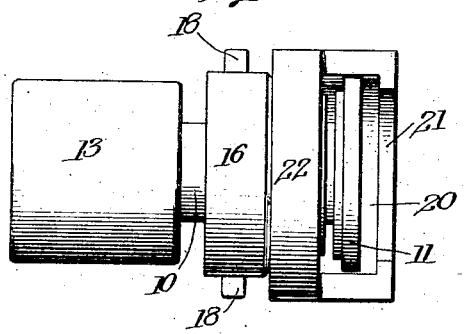
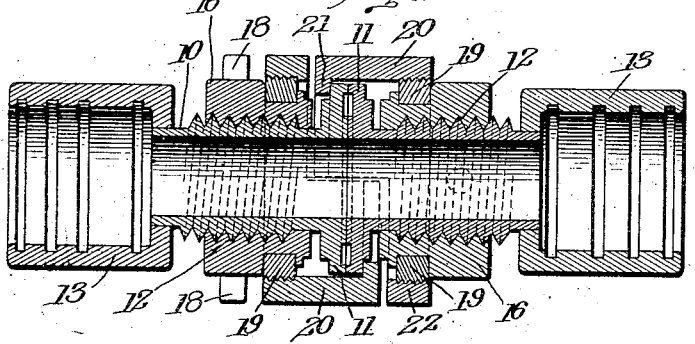
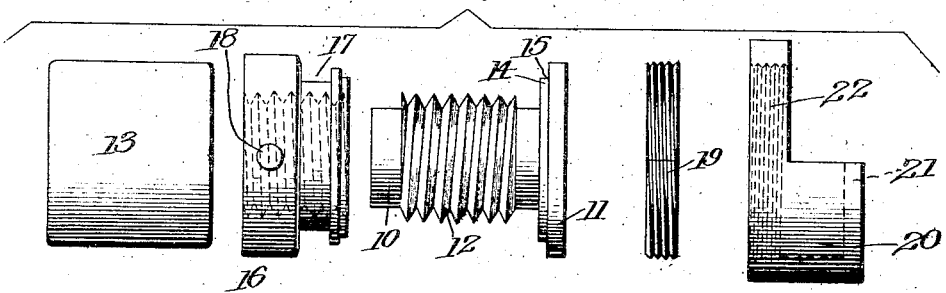
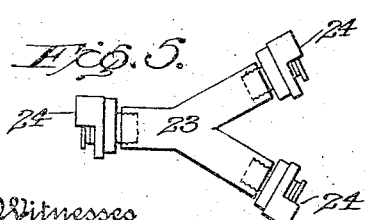
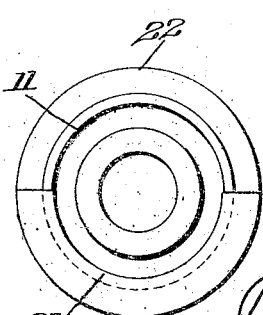

UNITED STATES PATENT OFFICE.

JAMES T. FUDGE, OF ELMIRA, NEW YORK.

COUPLING.

1,246,255.  Specification of Letters Patent.  Patented Nov. 13, 1917.

Application filed April 25, 1916. Serial No. 93,463.

*To all whom it may concern:*

Be it known that I, JAMES T. FUDGE, a citizen of the United States, and resident of Elmira, county of Chemung, State of New York, have invented certain new and useful Improvements in Couplings, of which the following is a specification.

This invention relates to couplings for connecting two conduits.

The objects of the invention are to provide a unit or half coupling, which when joined with an exact duplicate unit or half coupling will form a complete coupling; to provide a means to lock the coupling units when they have been joined together; to make a device in which the spanner lugs are protected so that they will not catch on projections; and to provide a simple and efficient device for accomplishing these objects.

The invention comprises a half coupling or unit adapted to coöperate with an exact duplicate half coupling or unit for the purpose of connecting the adjacent ends of two conduits. The half coupling or unit consists of a sleeve having a flange at one end, a lip axially spaced from the flange and connected to the sleeve; together with means for moving the lip and flange relative to each other in an axial direction.

These and other features of the invention including certain details of construction and combination of parts, will be set forth in the following description and pointed out in the claims.

Figure 1 is a side elevation of one of the units or half coupling;

Fig. 2 is a longitudinal section through a complete coupling consisting of two units or two half couplings, and shows the manner of connecting the two units;

Fig. 3 is a view showing the parts of a half coupling disassembled;

Fig. 4 is an elevation of the right hand end of a unit as shown in Fig. 1; and

Fig. 5 shows the application of the units to a Siamese connection.

A unit or half coupling comprises a sleeve 10 having a radially extending flange 11 at one end. At its other end the sleeve may be connected to a tube, pipe, hose or any form of conduit in any suitable manner. As shown the sleeve is connected to a collar 13 in any suitable way, the collar being adapted for receiving the end of a fire hose, for example. Intermediate the two ends the sleeve is formed with a left hand thread 12. The flange may be made thicker at its central part 14 to thereby form an annular shoulder 15.

A nut 16 is interiorly threaded and works on the thread 12. This nut is formed with an annular groove 17 near one end, and is provided with two spanner lugs or pins 18 at diametrically opposite points, to accommodate the spanner wrenches used in screwing up the coupling when connecting two units. The groove 17 has a divided ring 19 loosely seated therein. The ring is externally threaded, the thread being right hand and of a pitch less than the thread 12. It is necessary to divide the ring in order to assemble it in position. Other means might be used, but splitting the ring permits a simple and strong construction.

An annular member 22 has integrally connected therewith a semi-annular member 20. This latter member carries a radial inwardly extending lip 21 at one end. The annular member 22 is interiorly threaded and adapted to be slid over the flange 11 and screwed onto the ring 19 in the groove 17. When so assembled the lip is parallel to the flange 11 and axially spaced outside of the latter.

From the preceding description it will be apparent that when the nut 16 is turned relative to the sleeve, the flange 11 and lip 21 will be moved axially relative to each other.

The above described parts form a unit or half coupling. This unit or half coupling is adapted to coöperate with a duplicate device, as will now be set forth. Each of the units is adjusted by turning the nut 16, until the lip and flange are spaced apart a distance a little greater than the thickness of the flange. They are then arranged with their axes parallel but laterally offset, and with the semi-annular member 20 of one unit on the opposite side of its axis from the corresponding member of the other unit. Then the two units are moved laterally toward each other, the flange 11 of one unit fitting between the flange and lip of the other unit, and the two semi-annular members coöperating to form a complete annulus, all as clearly shown in Fig. 2. The nut members 16 are now operated to move the lip and flange of each unit toward each other, thereby clamping the flange of the other unit between the said flange and lip. The friction of the lip against the flange of the coöperating unit and the friction of the ring 19 in its groove 17 will tend to rotate the ring and annular member 22 relatively, and as the pitch of the thread on the ring is different from the thread 12 this will result in locking the parts in the coupled position. To unlock the units so that the coupling units may be separated, the nuts 16 are turned in the opposite direction. The two units may be then moved apart laterally.

As clearly shown in the drawings, the spanner pins or lugs 18 do not extend beyond the outer surface of the annulus 22. The annulus thus affords a guard for the lugs, and they will not catch in the rungs of the ladder and on projections when the hose or conduit is being dragged along.

As the two units of a complete coupling are duplicates, there is no danger of delay in connecting hose at a fire as may occur with the present couplings.

The adaptability of the coupling is shown in Fig. 4 where a Siamese connection 23 is illustrated equipped with coupling units 24 in accordance with this invention. Regardless of how it is desired to have the water flow through the Siamese, the couplings are ready and require no changes. With the old male and female connections, if it is desired to divide one stream into two, then the female connection is at the lower arm of the Siamese and the two others are male. Now if it is necessary to use this same Siamese to unite two streams into one, the female connection is changed to a male, and the two male connections are changed to female. However, all these changes, are obviated by the present invention.

Having described the invention what is claimed and desired to be secured by Letters-Patent is:—

1. A half coupling adapted to coöperate with a duplicate half coupling to join two conduits, comprising a sleeve adapted for connection to a conduit at one end and having an outwardly extending flange at its other end, a semi-annular member partially surrounding said flange and having an inwardly extending lip parallel to and outside of said flange, and means connecting said sleeve and semi-annular member whereby the flange and lip may be moved toward and from each other.

2. A half coupling adapted to coöperate with a duplicate half coupling to join two conduits, comprising a sleeve adapted for connection to a tube at one end and having an outwardly extending flange at the other, a nut member externally threaded to said sleeve intermediate its ends, a semi-annular member partially surrounding said flange and having an inwardly extending lip parallel to and spaced outside of said flange, said semi-annular member connected to said nut member for longitudinal movement therewith and rotation relative thereto, whereby relative rotation of the nut and sleeve moves the flange and lip toward or from each other.

3. A coupling, comprising a sleeve adapted for connection to the end of a tube and having an outwardly extending flange, a duplicate sleeve adapted for connection to the end of another tube with the two flanges abutting, duplicate means carried by each sleeve and engaging the opposite side of the flange on the other sleeve, and means on its supporting sleeve for moving the first mentioned means longitudinally thereon whereby the two flanges may be held in abutting positions.

4. In a construction for coupling conduits together which consists of two duplicate units, each unit comprising a sleeve having an outwardly extending circular flange at one end, a device carried by said sleeve and having means adapted to engage the corresponding flange of the other unit, and means carried by the respective unit for moving the first mentioned means longitudinally to thereby draw the flanges together.

5. In a construction for coupling conduits together which consists of two duplicate units, each unit comprising a sleeve having an outwardly extending circular flange at one end, a device carried by said sleeve and having means adapted to engage the corresponding flange of the other unit, and means on the unit for moving the first mentioned means longitudinally to thereby draw the flanges together, and screw means to lock the parts in coupled relation.

6. In a coupling, a sleeve having an outwardly projecting flange at one end, a nut member threaded to said sleeve, a semi-annular member of larger diameter than the nut, partially surrounding said flange and having an inwardly extending lip parallel to and spaced axially outside of said flange, said semi-annular member connected to said nut for rotation relative thereto.

7. A coupling unit comprising a sleeve flanged at one end and externally threaded, a nut member mounted thereon and having a peripheral groove, a member surrounding the flanged end and having a rotative connection with the groove at one end, its other end being semi-annular and having an inwardly extending lip spaced outside of the flange.

8. A half coupling adapted to coöperate with a duplicate half coupling to join two conduits, said half coupling comprising a sleeve having a flange at one end, a lip spaced axially outside of said flange and parallel thereto, means mounted on said sleeve and carrying said lip, and means for moving the lip and flange relative to each other in an axial direction.

9. A coupling unit comprising a sleeve flanged at one end and externally threaded, a nut member mounted thereon and formed with a peripheral groove, a ring seated in said groove, a member surrounding the flanged end and having threaded engagement with said ring and an inwardly extending lip parallel to and spaced axially outside of said flange.

In testimony whereof I affix my signature.

JAMES T. FUDGE.

Copies of this patent may be obtained for five cents each, by addressing the "Commissioner of Patents, Washington, D. C."